Jan. 4, 1966    P. KOLLSMAN    3,227,662
ANTIPOLARIZATION MEMBRANE HAVING ANIONIC AND CATIONIC AREAS
Filed Oct. 10, 1960    2 Sheets-Sheet 1

INVENTOR.
Paul Kollsman
BY Howard G. Russell
his ATTORNEY

3,227,662
ANTIPOLARIZATION MEMBRANE HAVING ANIONIC AND CATIONIC AREAS
Paul Kollsman, 100 E. 50th St., New York, N.Y.
Filed Oct. 19, 1960, Ser. No. 61,523
10 Claims. (Cl. 260—2.1)

This invention relates to improvements in electrodialysis membranes, cells, systems and methods and is primarily directed towards the reduction or elimination of polarization.

It is well known that the transfer of ions through permselective membranes, particularly if carried out at substantial current densities, is accompanied by the formation of a liquid zone of low conductance along membrane surfaces where ions pass from the electrolyte into a membrane, as they do in a deionization chamber, or where ions accompanied by solvent shells are depleted of a portion of the solvent incidental to passage of the ions from a zone of lower ionic concentration into a zone of higher ionic concentration. The accumulating solvent has high resistivity and limits the current density which may be obtained.

It has been suggested in the past to reduce the effects of polarization by a more or less mechanical wiping action, generally performed by a rapidly or turbulently flowing liquid. In this manner an accumulation of solvent is removed from the membrane surface and liquid of higher ionic concentration is mechanically moved toward the membrane surface.

The present invention follows a different approach. It involves the feeding of depolarizing ions into the polarization layer through the membrane, whereby the conductance of the layer is increased and the current limiting effect of the layer is reduced.

The invention is particularly applicable to methods and apparatus for deionizing ionic solutions of relatively low ionic concentration, such as solutions of less than 0.1 N. Thus, for example, brackish and hard water may be efficiently treated at current densities far above those previously employable in connection with conventional permselective membranes.

Conventional permselective membranes consist of a porous material containing fixed ion exchange sites capable of adsorbing and exchanging mobile ions of one polarity. In highly concentrated ionic solutions permselective membranes also contain a certain quantity of mobile ions of the opposite polarity, but their number is dependent on the ionic concentration of the solution contacting the membrane, so that in a deionized solution almost no ions of said opposite polarity are present.

For similar reasons leakage of non-selected ions across a membrane varies with the ionic concentration of the contacting solution. Such leakage flow may constitute 10 to 30 percent of the total ion flow in a conventional permselective membrane if the solution is an aqueous 1 N NaCl solution, but amounts to only 1 to 2 percent in 0.1 N NaCl solution. It tends to become zero, as the ionic concentration of the solution approaches zero.

The invention employs membranes which differ from the conventional permselective membranes in that the membranes made according to the invention contain both anionic and cationic ion exchange groups, so as to be capable of exchanging and conducting electrically driven ions of both polarities in solvated condition in opposite directions. The anionic and the cationic ion exchange groups are present in such proportions that the total membrane conductance for ions of one polarity exceeds the conductance for ions of the opposite polarity.

The ions of one polarity for which the membrane is primarily selective are for convenience termed "pol ions" in this description, and the ions of the opposite polarity which pass the membrane in the opposite direction, but in smaller numbers, are termed "depol ions."

The depolarizing effect of a membrane made according to this invention, sometimes hereinafter referred to as depol membrane, depends not only on the ratio of conductance of the depol ions with respect to the conductance of the pol ions, in other words a membrane characteristic, but also on the character of the ionic solution to be processed, particularly on the pH and the mobility of its different ions, an electrolyte characteristic.

A depol membrane therefore has two functions. It firstly operates as a permselective membrane and is capable of being used for all purposes where heretofore a conventional permselective membrane was used, for example concentration, deionization, fractionation, etc. It secondly operates to reduce or eliminate polarization and its accompanying phenomena, such as pH changes, and may therefore be operated efficiently where operation with conventional permselective membrane would be inefficient or impossible.

The depolarizing action of depol membranes is particularly desirable in deionization systems, for example multi-stage deionization units, where according to the invention an increasing degree of depolarization may be provided for as deionization proceeds, as for example in advanced stages.

Considering a depol membrane from the standpoint of permselectivity, a depol cation membrane for example has a predominant conductance for its exchangeable cations over its exchangeable anions. This predominance prevails regardless of differences in the mobilities of the ions, such as the cations which have a relatively low mobility and OH ions which have a high mobility.

For this purpose the membrane is being considered equilibrated in aqueous 0.1 N NaOH solution, representing the high pH of 13.

For brevity's sake ions of low and high mobility will hereinafter sometimes be referred to as "slow" and "fast" ions, respectively.

Similarly, in a depol anion membrane the conductance for anions exceeds the conductance for its exchangeable cations regardless of differences in ion mobility, the membrane being considered after equilibration in aqueous 0.1 N HCl solution representing the low pH of 1.1.

In distinction from conventional permselective membranes which in highly dilute ionic solutions contain exchangeable ions of one polarity only and practically none of the opposite polarity, depol membranes contain a definite ratio of ions of both polarities. This makes the depol membranes effective for uses where conventional permselective membranes exhibit strong polarization effects.

Taking aqueous KCl solution of 0.001 N as a standard of comparison, in a depol membrane in its KCl form the conductance of ions of one polarity exceeds the conductance of ions of the opposite polarity by a ratio of between 100/1 to 2/1.

Considering depol membranes under conditions of different ion mobilities, an average and two extreme conditions will illustrate the membrane characteristics. K and Cl ions are of about equal mobility, H has a mobility of about 5 times the mobility of Cl and OH has about 4 times the mobility of K.

Taking a certain depol membrane, equilibrating it in

1 N aqueous solution of HCl representing one extreme condition and subsequently leaching it in pure water, it shows a predominance in the content of exchangeable ions of one polarity over the ions of the opposite polarity of greater than 2 to 1. The same membrane equilibrated in aqueous 1 N NaOH solution representing the other extreme condition and thereafter leached in pure water still exhibits a predominance in the content of exchangeable ions of one polarity over the ions of the opposite polarity exceeding 2 to 1. This applies to depol anion membranes and depol cation membranes. As far as I am aware, no previous permselective membrane exhibited such or comparable properties.

It will later be explained how the conductances and their ratio may be determined conveniently.

A depol membrane is made from an ion exchange material containing preferably at least 0.3 milliequivalent of exchangeable ions per gram of dry membrane material and its solvent content is such that the ratio of equivalent exchangeable ions to the solvent contained in the membrane is at least 1 N.

The depolarizing activity of a depol membrane is inversely proportional to the ratio of the membrane conductance for ions of one polarity to the membrane conductance for ions of the opposite polarity. The result of the depolarizing activity is that a depol membrane may be operated at a relatively low potential, considering the number of ions being transferred, and that it may be operated at current densities at which ordinary permselective membranes polarize.

At extremely low potentials and current densities the current efficiency of a depol membrane is less than that of a comparable permselective membrane due to the transfer, for example, of a small number of depol ions into a deionization chamber. At substantial operating potentials and current densities, chosen for example with a view of maintaining heat development in a cell within tolerable bounds, the gain due to reduction in the operating potential far exceeds the loss in current efficiency.

Depol membranes may be prepared from known and commercially available materials by employing membrane making techniques known and presently used for making conventional permselective membranes. The known techniques are modified by the necessity of using both anion and cation material in the same membrane.

Four representative methods were employed in preparing the membranes listed in the following table giving the membrane compositions. The table is divided into four groups and each group represents a different method.

The first group is identified by order numbers beginning with 1, such as 13, the second group by order numbers beginning with 2, such as 21 and so forth. The letter C identifies a depol cation membrane, and the letter A represents a depol anion membrane. The figures indicate parts (in terms of weight). "Dynel" is a commercially available copolymer composed of six parts of vinyl chloride and four parts of acrylonitrile.

COMPOSITION OF MEMBRANE GROUPS 1–4 IN PARTS

| Membrane | Ionogenic compound | | Matrix compound "Dynel" |
|---|---|---|---|
| | Sulfonated | Quaternized | |
| Cation Membranes Group 1: | | | |
| C-11 | 36 | 4 | 60 |
| C-12 | 32 | 8 | 60 |
| C-13 | 28 | 12 | 60 |
| C-14 | 24 | 16 | 60 |
| Anion Membranes Group 1: | | | |
| A-14 | 16 | 24 | 60 |
| A-13 | 10 | 30 | 60 |
| A-12 | 8 | 32 | 60 |
| A-11 | 4 | 32 | 60 |
| A-10 | 2 | 34 | 60 |

| Membrane | Ionogenic compound | | Matrix compound "Dynel" | |
|---|---|---|---|---|
| | Sulfonated | Quaternized | Polystyrene | Divinyl benzene |
| Cation Membranes Group 2: | | | | |
| C-21 | 36 | 4 | 50 | 5 |
| C-22 | 32 | 8 | 55 | 5 |
| C-23 | 28 | 12 | 55 | 5 |
| C-24 | 24 | 16 | 55 | 5 |
| Anion Membranes Group 2: | | | | |
| A-24 | 16 | 24 | 55 | 5 |
| A-23 | 12 | 28 | 55 | 5 |
| A-22 | 8 | 32 | 55 | 5 |
| A-21 | 4 | 36 | 55 | 5 |
| Cation Membranes Group 3: | | | | |
| C-31 | 36 | 4 | 60 | 5 |
| C-32 | 32 | 8 | 60 | 5 |
| C-33 | 28 | 12 | 60 | 5 |
| C-34 | 24 | 16 | 60 | 5 |
| Anion Membrances Group 3: | | | | |
| A-34 | 16 | 24 | 60 | 5 |
| A-33 | 12 | 28 | 60 | 5 |
| A-32 | 8 | 32 | 60 | 5 |
| A-31 | 4 | 36 | 60 | 5 |

| Membrane | Ionogenic compound | | Mixture |
|---|---|---|---|
| | Sulfonated | Quaternized | |
| Cation Membranes Group 4: | | | |
| C-41 [1] | 75 | 25 | A |
| C-42 | 65 | 35 | A |
| C-43 | 80 | 20 | A |
| C-44 [1] | 75 | 25 | B |
| C-45 | 65 | 35 | B |
| C-46 | 80 | 20 | B |
| C-47 [1] | 75 | 25 | C |
| C-48 | 65 | 35 | C |
| Anion Membranes Group 4: | | | |
| A-48 | 35 | 65 | C |
| A-47 [1] | 25 | 75 | C |
| A-46 [1] | 20 | 30 | C |
| A-45 | 35 | 65 | B |
| A-44 | 25 | 75 | B |
| A-43 [1] | 20 | 80 | B |
| A-42 | 35 | 65 | A |
| A-41 | 25 | 75 | A |
| Cation-Anion Membranes Group 4: | | | |
| AC-42 [1] | 50 | 50 | A |
| AC-43 | 53 | 47 | B |
| AC-44 | 50 | 50 | C |

[1] Irradiated.

All these membranes meet the requirement that the conductance for mobile ions of one polarity exceeds the conductance for mobile ions of the opposite polarity over the entire pH range from 1.1 to 13 in an aqueous solution of 0.1 N, or at least within the pH range from 1.1 to 7 or in the range from pH 7 to 13.

For example, the conductance ratio of a C-12 membrane is 9.9 in 0.1 N NaCl solution at pH 7 and is 42.2 in 0.1 N HCl solution at pH 1.1. The conductance ratio of an A-11 membrane is 16.7 in 0.1 N NaCl solution at pH 7 and 38.1 in 0.1 N NaOH at pH 13.

The total exchange capacity for ions of both polarities exceeds 0.3 milliequivalent per gram of dry membrane material for all membranes.

For example, membrane C-14 has an exchange capacity of 0.81 milliequivalent per gram of dry resin. The material contained 0.36 g. of water. Consequently the ratio of equivalent exchangeable ions to water contained is 81/36=2.25.

*Group 1.*—Membranes were molded from a highly viscous solution of 40 parts of ionogenic compounds and 60 parts of Dynel and ½ part of benzophenone as catalyst dissolved in enough dimethyl formamide to form a highly viscous solution at 90° C. The molded membranes were then dried and irradiated for one hour at a temperature of 80° C. by a 100-watt mercury vapor lamp emitting ultraviolet rays of germicidal wave lengths to cause crosslinking within the membrane material. The irradiated membrane was then activated by successive immersion in aqueous solutions of 1 N HCl, 1 N NaOH and 1 N NaCl at a temperature of 70° C.

The ionogenic compounds used consisted of a mixture of polystyrene sulfonate in the form of its butyl ester and quaternized polystyrene in the form of its propionate in anhydrous condition. Butyl ester of polystyrene sulfonic acid is made by the reaction of an aqueous solution of equivalent quantities of polystyrene sulfonic acid in the H form and butyl alcohol and subsequent dehydration by drying in hot air. Propionate of quaternized polystyrene is made by the reaction of an aqueous solution of equivalent quantities of quaternized polystyrene in the OH form and propionic acid and subsequent dehydration by drying in hot air.

Different ratios of the sulfonate and the quaternized compounds produced the different membranes listed in the table.

In preparing membranes C–12 and A–12 dimethyl sulfoxide was used instead of dimethyl formamide.

*Group. 2.*—The membranes of this group were prepared in the same manner as the membranes of Group 1, except that Dynel was replaced by 55 parts of polystyrene and 5 parts of divinyl benzene as a matrix forming compound.

*Group 3.*—The membranes of this group were prepared in the same manner as in Group 1, except that Dynel was replaced by 60 parts of polyethylene of the high density type and 5 parts of divinyl benzene as a matrix forming compound. Furthermore, toluene was used as a solvent instead of dimethyl formamide.

*Group 4.*—Membranes were molded from a random mixture of dry anhydrous thermoplastic cation exchange resin particles in K form and thermoplastic anion exchange resin particles in Cl form by heating the mixture to 130° C. and applying a pressure of 2000 lb./sq. in. The molded membranes were activated by immersion in aqueous 1 N NaCl solution of 70° C.

Certain membranes were irradiated before activation by irradiating them for one hour by two 100-watt germicidal mercury vapor lamps. In order to render the irradiation more effective, one-quarter of one percent, by weight of the mixture, of benzophenone dissolved in benzene was added to the mixture. The benzene was removed before molding by drying.

Three mixtures were employed.

Mixture A: Particles of between 0.05 mm. to 0.1 mm. diameter produced by grinding up Amfion cation membranes and Amfion anion membranes.

Mixture B: Particles of fibrous form about 0.1 mm. in width and 0.5 mm. in length produced by shredding Amfion cation membranes and Amfion anion membranes.

A description of the process of making Amfion membranes is found in French Patent No. 1,777,380 and Republic of South Africa Patent No. 1900/57 of American Machine and Foundry Company.

Mixture C: Particles in fibrous form, the fibers being substantially straight filaments of 0.02 mm. diameter and 0.25 in length. The filaments were produced by graft-polymerizing polyethylene filaments with styrene. The graft-polymerized fibers were sulfonated to produce cation fibers, and quanternized to produce anion fibers.

Representative membranes were tested in an apparatus about to be described.

Figure 1:
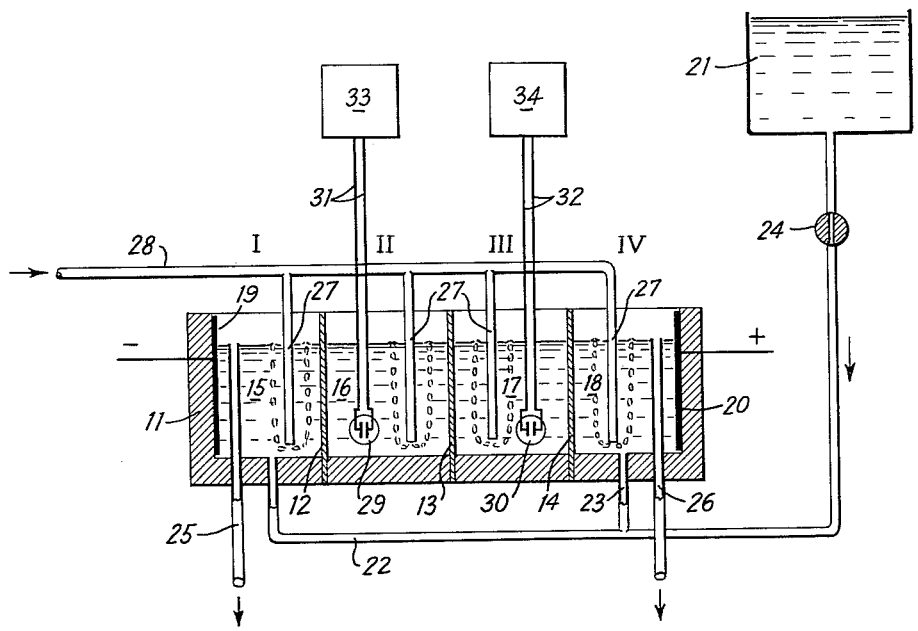
FIG. 1 is a diagrammatic representation of an apparatus for determining the conductance ratio of pol ions with respect to depol ions.

The cell housing 11 is subdivided by membranes 12, 13 and 14 into chambers 15, 16, 17 and 18, each chamber measuring 50 mm. in width, 70 mm. in height and 50 mm. in depth. Chamber 15 contains a platinum cathode 19 and chamber 18 contains a platinum anode 20.

Electrolyte stored in a tank 21 may be conducted into the chambers 15 and 18 through ducts 22 and 23 controlled by a valve 24, and overflow pipes 25 and 26 determine the liquid levels in chambers 15 and 18, the height of the overflow pipes being 50 mm. The effective area of each membrane is therefore 50 x 50 x 50 mm.

Air discharge pipes 27 extending from a compressed air duct 28 agitate the contents of all chambers.

Chambers 16 and 17 contain conductivity cells 29 and 30 connected by leads 31 and 32 to conductivity measuring bridges 33 and 34.

The membrane 13 is a depol membrane, membrane 12 is an anion permselective membrane and membrane 14 is a cation permselective membrane.

For the test Amfion anion and Amfion cation membranes were used.

Basically, the depol membranes may be tested in any ionic solution including brackish water, seawater, acids or bases varying between pH 1.1 to pH 13. For the test the membrane is equilibrated in a concentrate of the solution to be employed, and the test solution is then prepared by adjusting the solution by addition or removal of solvent to a resistivity of 1000 ohms/cm. at 18° C. measured by a conventional conductivity bridge.

The membranes were equilibrated and tested in KCl solution. Aqueous KCl solution of 1000 ohms/cm. resistivity was filled into the chambers 16 and 17 to a level of 50 mm. and a current of 2 ma. was passed through the apparatus while the contents were being agitated by compressed air.

The changes in resistivity of the electrolyte in chambers 16 and 17 were observed and as soon as the resistivity in one chamber reached 800 ohms/cm., the then-prevailing resistivity in the other chamber was noted.

The ratio of the greater decrease in resistivity in one chamber divided by the lesser decrease in resistivity in the other chamber represents the conductance ratio.

If the decrease in resistivity in chamber 16 is greater than that in chamber 17, the tested membrane 13 is a depol cation membrane. If the decrease in resistivity in chamber 16 is less than that in chamber 17, the tested membrane 13 is a depol anion membrane.

The membranes listed in the above table were tested in KCl solution and showed conductance ratios ranging from 99 to 2.

More particularly, membrane C–13 was tested and produced a resistivity drop in chamber 16 of 200 ohms/cm. and in chamber 17 a resistivity drop of 30 ohms/cm. This established the membrane as a depol cation membrane with a conductance ratio of 200/30=6.66.

Membrane A–22 was tested in brackish water solution and produced a resistivity decrease of 200 ohms/cm. in chamber 17 and a decrease of 16 ohms/cm. in chamber 16. The membrane was therefore a depol anion membrane having a conductance ratio of 200/16=12.5.

Membrane C–12 was tested in NaOH solution and produced a resistivity decrease in chamber 16 of 200 ohms/cm. and a decrease of 53 ohms/cm. in chamber 17. It therefore was established as a depol cation membrane having a conductance ratio of 200/53=3.8.

Membrane A–11 was tested in HCl solution. Resistivity decrease in chamber 17—200 ohms/cm. Resistivity decrease in chamber 16—72 ohms/cm. The membrane was therefore a depol anion membrane having a conductance ratio of 200/72=2.8.

In general, the tested depol membranes showed conductance ratios which are substantially greater than the ratio of the corresponding ionogenic groups in the ionogenic compounds contained in the ion exchange material of which they are composed.

In membrane C–13 the ratio of cation exchange groups to anion exchange groups is approximately equal to the ratio of sulfonated polystyrene to quaternized polystyrene, the latter being 28/12=2.33.

Its ratio of exchangeable K ions to exchangeable Cl ions in water-leached condition was 4.73 and its conductance ratio in KCl is 6.66. It is therefore concluded that a substantial number of the anion exchange groups in the material are occluded, blocked or neutralized by the predominating cation exchange groups in the material.

In order to substantiate this conclusion several of the membranes were treated in accordance with the principles set forth in my copending application Serial No. 54,936, now Patent No. 3,180,814, dated April 27, 1965, by passing an electric current of 2000 ma./cm.$^2$ density through the membrane while the membrane was immersed in aqueous 2 N KCl. Simultaneously, the membrane was heated sufficiently to cause softening of the membrane material to cause rearrangement of the molecular structure, followed by subsequent hardening of the material by cooling.

The treatment of the depol membranes resulted in a substantial reduction of the conductance ratio indicating a molecular rearrangement in which certain of the previously inactive ionogenic groups became active.

Membrane C–13 was treated in the aforesaid manner with the result that the conductance ratio changed from 6.66 in KCl solution before treatment to 4.85 in KCl solution after treatment.

Membrane A–22 having a conductance ratio of 12.5 in brackish water before treatment showed a conductance ratio of 8.1 after treatment in the same brackish water. In general, the current treatment produced an improvement in the conductivity of the membrane material.

Figure 2:
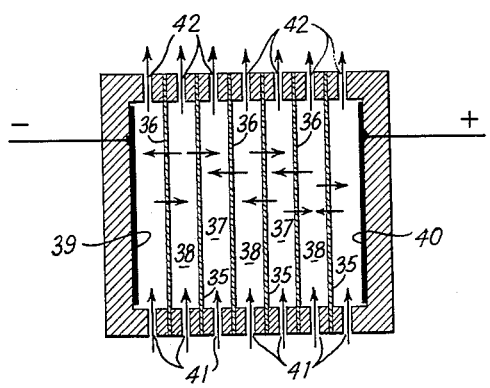
FIG. 2 is a diagrammatic representation of a multi-membrane cell.

In order to demonstrate the performance of the depol membranes according to this invention and in order to compare their performance with that of conventional permselective membranes, a multichamber cell was constructed (FIG. 2 illustrates the membrane arrangement) comprising anion membranes 35 and cation membranes 36 in alternating sequence resulting in the formation of alternating concentration chambers 37 and deionization chambers 38 between terminal electrodes 39 and 40. All membranes measured 100 x 100 mm. and were spaced 2 mm. All chambers had bottom inlets 41 and top outlets 42 for passing electrolyte through the chambers.

*Test A.*—Conducted with Amfion cation membranes and Amfion anion membranes. Liquid flow through all chambers: natural brackish water consisting of 2650 parts per million solids, predominantly NaCl. Electrode potential, 4 volts. The flow rate through the chambers was so adjusted that the current became 180 ma. The potential was then changed and the corresponding current was noted.

Figure 3:
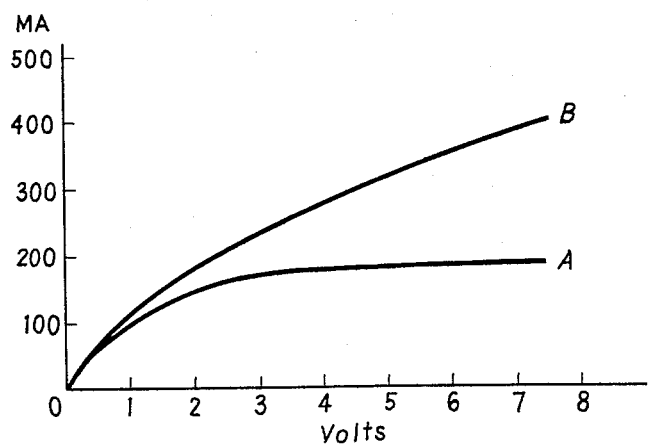
FIG. 3 is a graph representing differences in operation of the cell of FIG. 2 with conventional permselective membrane and depol membranes.

*Test B.*—A comparison test was conducted with depol cation membranes C–13 having conductance ratios in brackish (predominantly NaCl) water between 4.6 and 4.9, the average being 4.75 and depol anion membranes having a conductance ratio in brackish water between 8.4 and 8.8, the average being 8.6. In other respects the test conditions were identical to those in Test A. The dilute product was deionized to 990 parts per million. The results of the tests are shown in FIG. 3.

Curve A shows that the obtainable current was limited to less than 200 ma. with the Amfion membranes. Curve B shows that no such liimtation existed for depol membranes.

The depol membranes were so chosen that the conductance ratio of the cation membranes for the slower ions, primarily Na ions, was less than the conductance ratio of the anion membranes for the Cl ions of greater mobility. The proportion of the ratio of the anion membrane to the ratio of the cation membrane was 8.6/4.75=1.8 which is greater than the ratio of mobilities of Cl and Na, respectively, i.e., 65.5/43.5=1.5.

Figure 4:
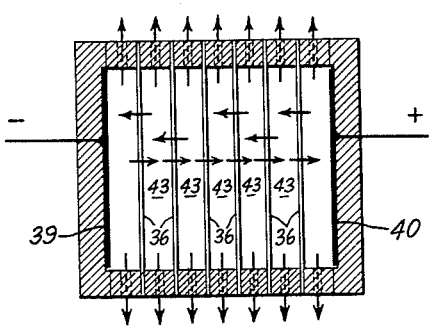
FIG. 4 is a diagrammatic sectional elevation of a multi-membrane concentration and dilution cell.
Figure 5:
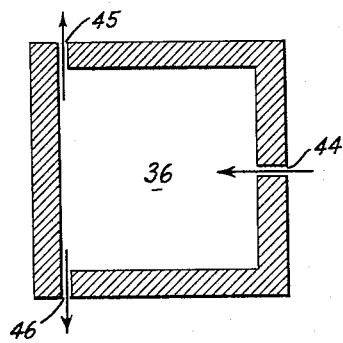
FIG. 5 is a sectional side view of the cell of FIG. 4.

FIGS. 4 and 5 illustrate a further test cell comprising cation membranes 36 between electrodes 39 and 40. Each of the five chambers 43 has a central inlet 44 and top and bottom outlets 45, 46, respectively. Each membrane measured 100 x 100 mm. and the membranes were spaced 3 mm. apart.

*Test C.*—Apparatus equipped with Amfion cation membranes. Liquid to be treated: brackish water containing 2250 parts per million. Flow rate through electrode chambers, 60 cc./min. One-half the volume supplied to each treatment chamber was withdrawn through top outlet 45 and one-half through bottom outlet 46. Operating potential, 4 v. The inflow rate into the treatment chambers was so adjusted as to produce a current of 130 ma. The potential was then varied and the resulting current was noted.

*Test D.*—The test was then repeated with depol cation membranes and the current was observed under various conditions.

Figure 6:
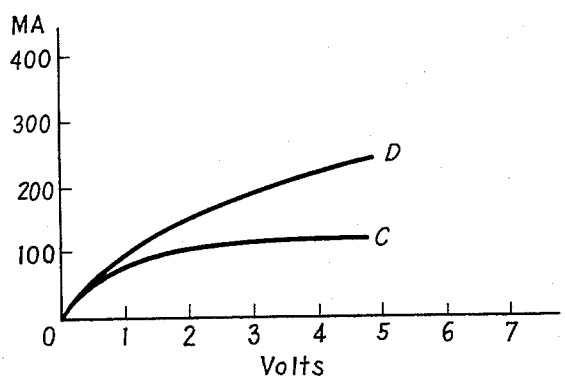
FIG. 6 is a graph representing comparative operational data of the cell of FIG. 4.

FIG. 6 shows the results of both tests. Curve C has an asymptotic maximum of slightly more than 100 ma. Curve D is not so limited but exceeds 200 ma.

*Test E.*—Electrically conductive membrane spacers were installed in the deionization chambers of the apparatus of FIG. 2. The spacers were basically of grid construction (as disclosed in greater detail in my copending application Serial No. 68,065, filed November 8, 1960) and were molded from the material composition AC–43. Liquid treated: brackish water as used in Test B.

The cation membranes C–13 had a conductance ratio between 4.6 and 4.9, an average of 4.75. The depol anion membrane had a conductance ratio of between 8.4 and 8.8, the average being 8.6. The spacer had a conductance ratio in the brackish water of 1.04 of cations over anions.

Result: The dilute was deionized to 285 parts per million.

Comment: The high degree of deionization is due to the action of the filler which removes depol ions from the liquid immediately after emergence of the depol ions from the membranes and at a point where the depol ions have performed their depolarizing function. Thus ion enrichment of the dilute by the depol ions is minimized.

The ratio of conductance of cations over anions in the spacer is nearer unity than the conductance ratio of the depol membranes. In the example the conductance of the filler for the anions of relatively higher mobility is slightly less than its conductance for the cations of relatively lower mobiilty.

What is claimed is:

1. An ion selective self-depolarizing membrane of ion exchange resin material comprising certain synthetic organic polymer particles to which anion exchange sites are fixedly attached, and other synthetic organic polymer particles to which cation sites are fixedly attached, said two polymer particles being commingled uniformly throughout the entire thickness of the membrane and present in unequal amounts in such relative proportions that the membrane conductance for mobile ions of one polarity exceeds the conductance for mobile ions of the opposite polarity over the entire pH range from 1.1 to 13 at an aqueous solution concentration of 0.1 N, the lesser particles being present in an amount, in terms of weight, of at least five percent of the predominant particles.

2. A cation selective self depolarizing membrane of ion exchange resin material comprising certain synthetic organic polymer particles to which anion exchange sites are fixedly attached, and other synthetic organic polymer particles to which cation exchange sites are fixedly attached, said two polymer particles being commingled uniformly throughout the entire thickness of the membrane and present in unequal amounts in such relative proportions that the membrane conductance for mobile cations exceeds the conductance of the membrane for mobile anions over the entire pH range from 1.1 to 13 at an aqueous solution concentration of 0.1 N, said other particles being present in an amount, in terms of weight, of at least five percent of the said certain particles.

3. An anion selective self-depolarizing membrane of ion exchange resin material comprising certain synthetic organic polymer particles to which anion exchange sites are fixedly attached, and other synthetic organic polymer particles to which cation exchange sites are fixedly attached, said two polymer particles being commingled uniformly throughout the entire thickness of the membrane and present in unequal amounts in such relative proportions that the membrane conductance for mobile anions exceeds the conductance of the membrane for mobile cations over the entire pH range from 1.1 to 13 at an aqueous solution concentration of 0.1 N, said certain particles being present in an amount, in terms of weight, of at least five percent of the said other particles.

4. An ion selective self-depolarizing membrane of ion exchange resin material comprising certain synthetic organic polymer particles to which anion exchange sites are fixedly attached, and other synthetic organic polymer particles to which cation sites are fixedly attached, said two polymer particles being commingled uniformly throughout the entire thickness of the membrane and present in unequal amounts in such relative proportions that the membrane conductance for mobile ions of one polarity exceeds the conductance for mobile ions of the opposite polarity over the entire pH range from 1.1 to 13 at an aqueous solution concentration of 0.1 N, the lesser particles being present in an amount, in terms of weight, of at least five percent of the predominant particles, the total exchange capacity for ions of both polarities being at least 0.3 milliequivalent per cubic centimeter of membrane material.

5. An ion selective self-depolarizing membrane of ion exchange resin material comprising certain synthetic organic polymer particles to which anion exchange sites are fixedly attached, and other synthetic organic polymer particles to which cation sites are fixedly attached, said two polymer particles being commingled uniformly throughout the entire thickness of the membrane and present in unequal amounts in such relative proportions that the membrane conductance for mobile ions of one polarity exceeds the conductance for mobile ions of the opposite polarity over the entire pH range from 1.1 to 13 at an equeous solution concentration of 0.1 N, the lesser particles being present in an amount, in terms of weight, of at least five percent of the predominant particles, the total exchange capacity for ions of both polarities being at least 0.3 milliequivalent per cubic centimeter of membrane material, and the ratio of equivalent exchangeable ions to solvent contained in the membrane being at least 1 N.

6. An ion selective self-depolarizing membrane of ion exchange resin material comprising certain anion exchange synthetic organic polymer particles and other cation exchange synthetic organic polymer particles, the two kinds of particles being present in unequal amounts and being commingled uniformly throughout the entire thickness of the membrane and present in such relative proportions that the total conductance of the membrane for ions of one polarity exceeds the total conductance of the membrane for ions of the opposite polarity regardless of the direction of the current passing therethrough, conductance being considered in an electrolyte of 0.1 N, the membrane being in NaOH form in the case of predominant cation selectivity and in HCl form in the case of predominant anion selectivity, respectively, the amount of the kind of particles present in the lesser amount being at least five percent, in terms of weight, of the particles present in the predominant amount.

7. An ion selective self-depolarizing electrodialysis membrane composed of certain particles of synthetic organic cation exchange resin and other particles of synthetic organic anion exchange resin, the two kinds of particles being commingled substantially uniformly throughout the thickness of the membrane to form a heterogeneous membrane, the two kinds of particles being of a size having a maximum dimension of not less than 0.02 and not more than 0.25 millimeter and being present in unequal amounts and in a ratio in which the kind present in a lesser amount is at least five percent, by weight, of the kind present in a predominant amount, the total membrane conductance for ions of one polarity exceeding the total conductance for ions of the opposite polarity regardless of the direction of current passing through the membrane.

8. An ion selective self-polarizing electrodialysis membrane of ion exchange resin material comprising two kinds of synthetic organic ion exchange components of at least polymer size, the one kind being anionic, the other kind being cationic, both kinds being present in unequal quantities, the lesser quantity being at least five percent of the predominant quantity, both kinds of components being commingled substantially uniformly throughout the entire thickness of the membrane and providing an overall membrane conductance for ions of one polarity exceeding the overall membrane conductance for ions of the opposite polarity within the range of 100/1 to 2/1, when immersed in 0.001 N aqueous KCl solution, and irrespective of the direction of the current passing through the membrane.

9. A selective self-depolarizing electrodialysis membrane of synthetic organic ion exchange material comprising a resin matrix in which are present certain matrix components of polymer size to which anion exchange sites are fixedly attached, and other matrix components of polymer size to which cation exchange sites are fixedly attached, the two matrix components being present in unequal amounts, commingled uniformly throughout the entire thickness of the membrane and in such relative proportions that the content of exchangeable ions of one polarity exceeds the content of exchangeable ions of the opposite polarity by a ratio greater than 2 to 1, considering the ion exchange resin in leached-in-pure-water condition after equilibration in 3 N aqueous KCl solution prior to leaching, the ion exchange resin component of one polarity constituting at least five percent, by weight, of the component of the other polarity.

10. A selective self-depolarizing electrodialysis membrane of ion exchange material composed of synthetic organic cation particles of polymer size and synthetic organic anion resin particles of polymer size, as distinguished from monomer size, the two kinds of particles being commingled substantially uniformly throughout the entire thickness of the membrane and present in unequal amounts, the particles of one kind constituting at least five percent, by weight, of the particles of the other kind whereby the membrane conductance for the less mobile ions of the other kind exceeds the membrane conductance for ions of higher mobility of the opposite polarity.

References Cited by the Examiner

UNITED STATES PATENTS

| | | | |
|---|---|---|---|
| 2,614,976 | 10/1952 | Patnode | 260—2.2 |
| 2,854,393 | 9/1958 | Kollsman | 204—180 |

(Other references on following page)

UNITED STATES PATENTS

| | | | |
|---|---|---|---|
| 2,854,394 | 9/1958 | Kollsman | 204—180 |
| 2,900,353 | 8/1959 | Cassidy | 260—2.2 |
| 2,963,453 | 12/1960 | Hwa | 260—2.2 |
| 3,041,292 | 6/1962 | Hatch | 260—2.2 |

FOREIGN PATENTS 5,971  7/1959  Japan.

OTHER REFERENCES

Frilette: J. Physical Chemistry, vol. 60, pages 435–8, April 1956.

WILLIAM H. SHORT, *Primary Examiner.*

JOHN R. SPECK, JOSEPH R. LIBERMAN, *Examiners.*

G. KAPLAN, J. C. MARTIN, *Assistant Examiners.*